Aug. 21, 1956  J. H. SMITH  2,759,319
ELECTRIC ROTARY EDGE TRIMMER
Filed May 18, 1954  2 Sheets-Sheet 1
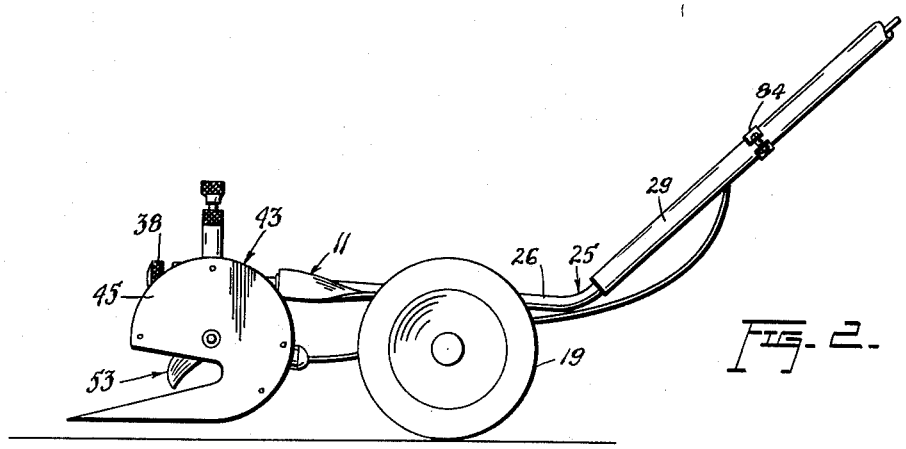
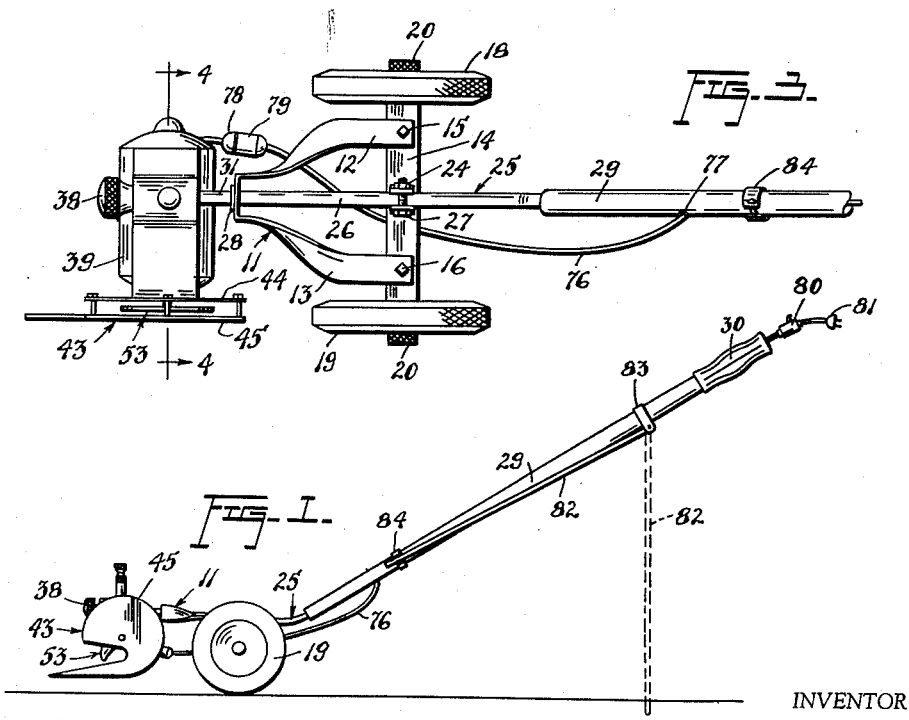
INVENTOR
James H. Smith
BY 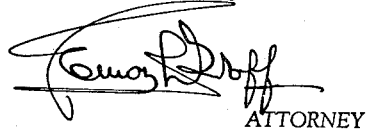
ATTORNEY Aug. 21, 1956 J. H. SMITH 2,759,319
ELECTRIC ROTARY EDGE TRIMMER
Filed May 18, 1954 2 Sheets-Sheet 2
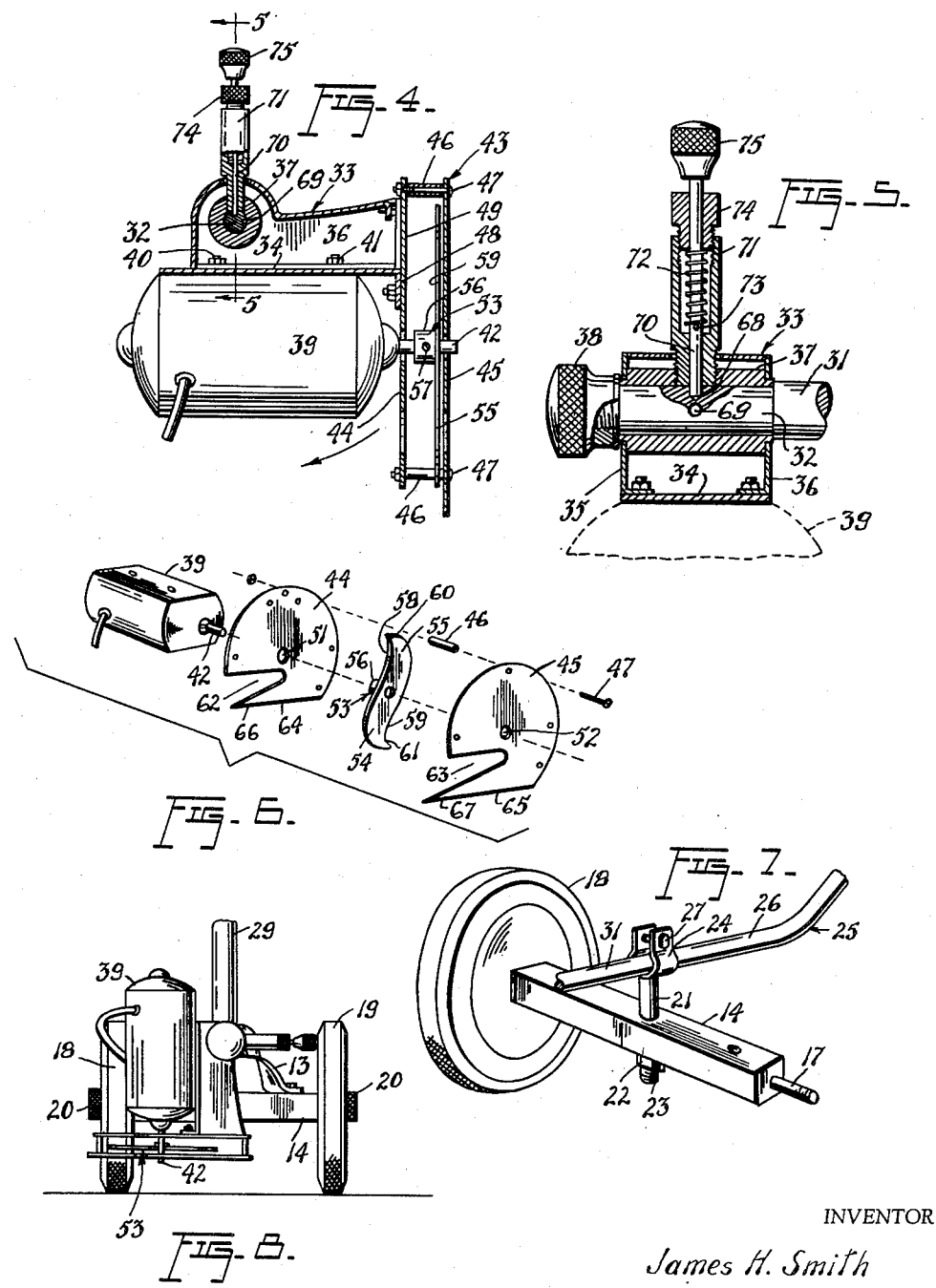
INVENTOR
James H. Smith
BY
ATTORNEY

United States Patent Office 2,759,319
Patented Aug. 21, 1956

2,759,319

ELECTRIC ROTARY EDGE TRIMMER

James Henry Smith, Fort Worth, Tex.

Application May 18, 1954, Serial No. 430,575

1 Claim. (Cl. 56—25.4)

This invention relates to devices for trimming grass and other growing vegetation around the edges of lawns, curbs, sidewalks, driveways, buildings, trees, flower beds, walls, and other places which cannot usually be conveniently reached with ordinary lawn mowers.

An object of the invention is the provision of a device which can be easily adjusted to cut in either a vertical or a horizontal plane, as well as in a plane intermediate between the horizontal and vertical.

Another object of the invention is the provision of such a device having cutting members and means for protecting the cutting members from contact with stones, debris, and other objects which are likely to cause injury thereto or reduce efficiency thereof.

A further object of the invention is the provision of such a device which is small, compact, light in weight, rugged and simple to manufacture and operate, and which is easily moved over the surface of the ground by a person.

These and other objects and advantages of the invention will be apparent from the following description considered together with the accompanying drawing.

In the drawing:

Fig. 1 is a side elevational view of an embodiment of the invention with the cutting unit in a vertical position.

Fig. 2 is a view similar to Fig. 1, partly broken away, but on a larger scale.

Fig. 3 is an enlarged plan view of the embodiment.

Fig. 4 is an enlarged partial section along the line 4—4 of Fig. 3.

Fig. 5 is an enlarged section along the line 5—5 of Fig. 4.

Fig. 6 is an exploded perspective view of parts of the cutting unit.

Fig. 7 is a perspective view showing the means for mounting the wheels and main frame member.

Fig. 8 is a front elevational view of the assembled device with the cutting unit in the horizontal position.

Referring with more particularity to the drawing in which like numerals designate like parts, the embodiment illustrated has a frame structure comprising a rigid yoke member 11, the arms 12 and 13 thereof projecting rearwardly and being secured to a horizontal axle 14 by bolts 15 and 16, or by any other suitable means.

The axle 14 has spindles 17 at either end upon which ground wheels 18 and 19, preferably rubber tired, are mounted. Hub nuts 20 hold the wheels on the spindles.

At the middle of the axle 14, a vertical post 21 is rigidly secured, such as by a nut 22 on a bottom threaded portion 23, and a U-clamp 24 is secured to the top of the post. A bent rod or handle bar 25 has a lower forward horizontal portion 26 seated in the clamp 24 and it is secured thereto by a clamping bolt 27. The portion 26 extends through an aperture in the bight portion 28 of the yoke member 11. The rearward end 29 of the bar 25 slopes upwardly and is provided with a hand grip 30 of rubber, plastic, or other suitable material for the operator.

The forward end 31 of the portion 26 includes a spindle 32 for a bracket 33, said bracket comprising a base plate 34, side walls 35 and 36 and a sleeve bearing 37 disposed between and secured to the walls 35 and 36. The bearing 37 is rotatably mounted on the spindle 32 and is held in position by a knurled nut 38.

An electric motor 39 is secured to the plate 34 by means of bolts 40, 41, and has its power take-off shaft 42 extending on one side through the cutting unit 43.

The unit 43 comprises a pair of spaced circular plates, namely, inner plate 44 and outer plate 45, which are held in spaced relation to each other by means of tubular spacers 46 and bolts 47 passing through the plates and spacers and holding them together, substantially as shown. The inner plate 44 is secured to a flange 48 of the bracket plate member 34 and to flanges of the side walls 35 and 36 of said bracket, such as the flange 49 of side wall 36.

The plates 44 and 45 are provided with central coaxial apertures 51 and 52, respectively, for the take-off shaft 42 of the motor 39. Between the plates 44 and 45, there is mounted on the shaft 42 a cutter blade 53 having radial arms 54 and 55. The cutter blade is secured to the shaft 42 for rotation therewith by means of a collar 56 attached to the blade and a set screw 57 carried by the collar for frictional engagement with shaft 42.

The leading edges 58 and 59 of the arms of the blade are preferably formed with hook portions 60 and 61 to increase cutting efficiency.

The plates 44 and 45 are provided with notches 62 and 63 to expose the rotating arms of the cutter blade and to provide a passageway thereto for the grass or other vegetation to be cut. The plates 44 and 45 are also provided with flat edges 64 and 65 at the outer edge adjacent their respective notches forming thereby forwardly extending V-shaped lips 66 and 67. Although the lips 66 and 67 may be of the same size, it is unnecessary and, in the interest of saving material, the inner lip 66 may be cut back somewhat as shown, the outer lip 67 extending forwardly to provide a wider swath.

The bracket 33 is held in selected positions of rotation on the spindle 32 by means of recesses 68 and 69 (only two shown) and a spring biased cooperating plunger 70 carried by the bearing 37. The plunger 70 is slidably disposed in a tubular housing member 71 secured to the bearing 37 and a coil spring 72 is disposed in compression between a pin 73 on the plunger and a collar 74 forming the upper end wall of the housing. The plunger passes through the collar and the end thereof is provided with a knurled knob 75 for manually raising the plunger against the resilient action of the coil spring.

As illustrated, when the inner end of the plunger is engaged with the recess 68, the cutting unit is in a vertical plane, as shown in Figs. 1, 2, 3 and 4. When the plunger is engaged with the recess 69, the cutting unit is in a horizontal plane, as shown in Fig. 8. One or more intermediate positions may, if desired, be provided by an additional recess or additional recesses (not shown) in the spindle, similar to the recesses 68 and 69.

The rearward end 29 of the bar 25 is preferably hollow for the purpose of passing therethrough an electrical cord 76 between the upper end thereof and an opening 77 at the bottom for connection to the motor with electrical plugs 78 and 79. The other end of the cord, emerging from the upper end of the bar 25, is provided with a switch 80 and a suitable plug 81 for connection to an extension or field cord (not shown) leading to a source of electric current (not shown).

A stanchion rod 82 is also provided for the bar 25. One end of the rod 82 is pivoted to a bracket 83 clamped to the rearward portion 29 near the top thereof and when it is in vertical position, the lower end of the rod 82 contacts the ground and thus supports the device in an upright position when not in use, as shown by the dotted lines in Fig. 1. When the device is in use, the rod 82 is placed in an out-of-the-way position by engaging its lower end with a clamp 84 on the lower end of the portion 29.

When the cutter unit is held in the vertical position it is effective in cutting grass, weeds, etc., which are lying flat or bent over, such as is customarily encountered on the edges of lawns, flower beds, etc., especially where the vegetation has been permitted to grow too long before cutting or where it habitually grows in a flat position relative to the ground.

In the horizontal position, the cutter is most effective in cutting tall standing grass, weeds, etc., such as is usually encountered adjacent trees, buildings, walls, etc. The flat outer edge of the cutter unit and the pointed lip thereof are particularly effective in the latter case to permit getting close to the object and guiding the grass to the cutter blade without danger of harming the blade or object.

It is to be understood that various changes in details of construction, materials, form, size, shape and arrangement of parts, may be made in the embodiment illustrated within the terms of the appended claim without departing from the spirit and scope of the invention.

I claim:

A lawn edge trimmer comprising in combination, an axle, wheels mounted on the axle, a horizontal yoke member having its arms secured to the axle, a handle bar including a horizontal portion carried by said axle, said horizontal portion extending through the bight of the yoke member and having a spindle on the end thereof, a bracket rotatably carried on said spindle, means for releasably securing the bracket in different positions of rotation relative to the spindle, said means comprising a spring biased plunger carried by the bracket, said spindle having plurality of recesses for receiving the plunger in a selected position of rotation of the bracket relative to the spindle, an electric motor mounted on the bracket and rotatable therewith, said motor having a take-off shaft, a cutter blade mounted on said shaft, a housing for said blade secured to said bracket and comprising inner and outer plate members of substantially identical configuration, said plates being arranged on either side of said blade to form a protective shield against damage to the blade from either a vertical or horizontal direction, and said plates having cut-out portions for guiding grass or other vegetation to be cut into the path of the cutter blade.

References Cited in the file of this patent
UNITED STATES PATENTS

| | | |
|---|---|---|
| 2,410,196 | Benthall | Oct. 29, 1946 |
| 2,608,043 | Berdan | Aug. 26, 1952 |
| 2,618,919 | Hutchens | Nov. 25, 1952 |
| 2,680,945 | Reed | June 15, 1954 |